INVENTOR
Sheldon E. Wells
ATTORNEY

Oct. 27, 1959 S. E. WELLS 2,910,192
TUBE HANDLING APPARATUS
Filed March 18, 1957 5 Sheets-Sheet 3

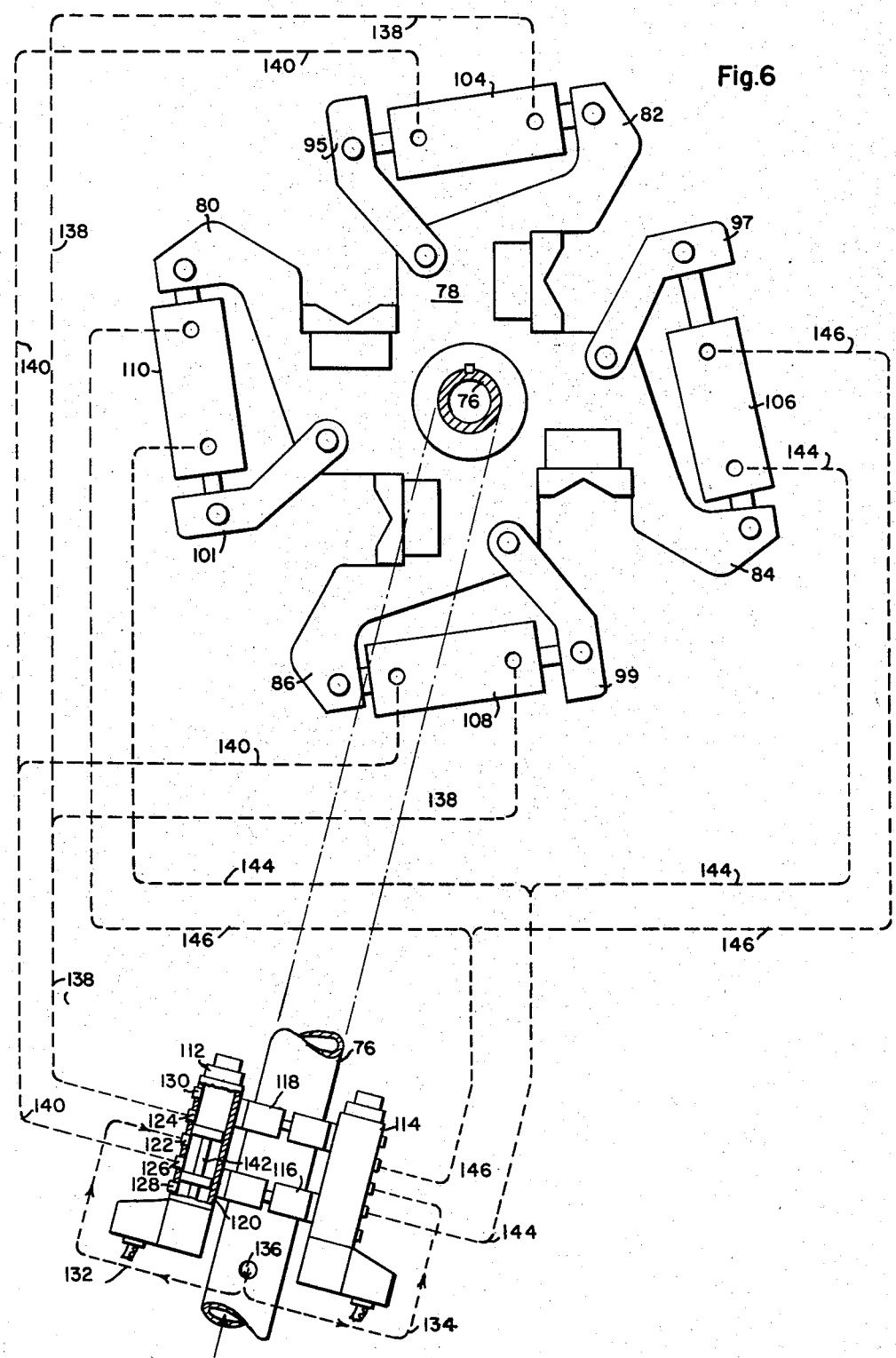

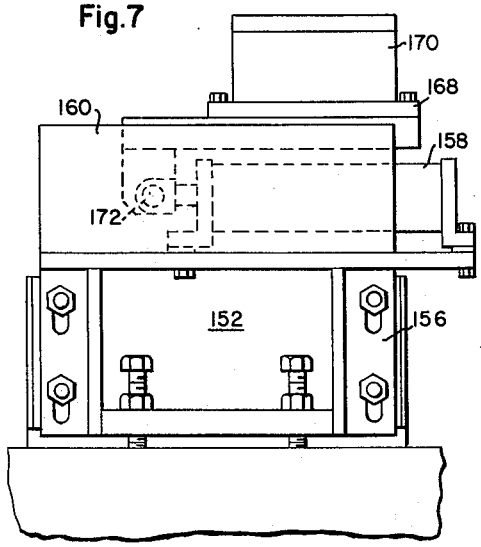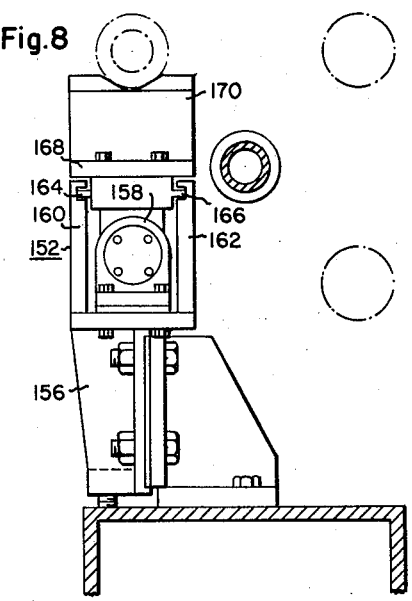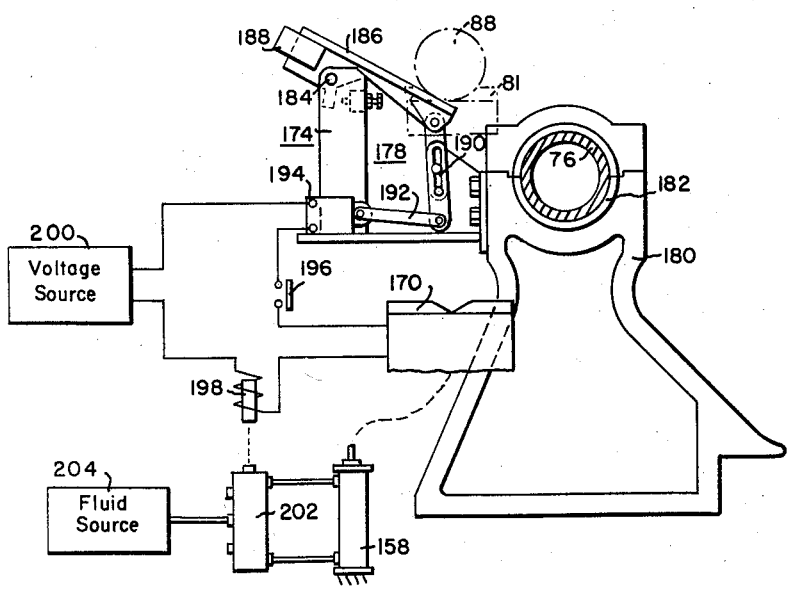

United States Patent Office 2,910,192
Patented Oct. 27, 1959

2,910,192

TUBE HANDLING APPARATUS

Sheldon E. Wells, Youngstown, Ohio, assignor to Lombard Corporation, Youngstown, Ohio, a corporation of Ohio Application March 18, 1957, Serial No. 646,829

11 Claims. (Cl. 214—1)

This invention relates to apparatus for conveying tubular members or the like from a loading station to a work station where an operation is performed on the ends of the tubular members, and then to an unloading station where the members are discharged from the conveyor.

It is sometimes necessary to thicken the wall on the end of tubing or to form a flange or other similar shape to facilitate threading the end of the tubing or to provide a flanged end for automobile rear axle housings or welding necks. The process by which the end of the tubing is thickened or flanged is a forging operation called "upsetting." In this process the end of a tube is held within a die by gripper jaws, and a flanged mandrel is forced into the tube such that when the flange on the mandrel strikes the end of the tube, it expands to conform to the inner periphery of the die. The present invention has particular, but by no means exclusive, utility when used with an upsetting machine of the type described above.

It is an object of this invention to provide apparatus for conveying tubular members or the like from a loading station to a work station and then to an unloading station where the members are discharged from the conveyor.

More specifically, an object of the invention lies in the provision of means for conveying tubular members to and from an upsetter machine where a forging operation is performed on the ends of the members.

Another object of the invention is to provide conveying means which will dislodge the ends of tubular members from the die of an upsetter machine after an operation is performed on said ends of the members.

A still further object of the invention is to provide magnetic pipe gripping apparatus for positively indexing the ends of tubular members.

The above and other objects and features of the invention will become apparent from the following detailed description taken in connection with the accompanying drawings which form a part of this specification and in which:

Figure 6 is a schematic diagram of the valve and piping arrangement for the pneumatic cylinders shown in Figure 3;

Figure 7 is a side view of the magnetic pipe gripping apparatus of the invention for positively indexing pipe preparatory to its being inserted into the dies of an upsetter machine;

Figure 8 is an end view of the apparatus shown in Figure 7; and

Figure 9 is a view of one of the two control switches for the gripping apparatus shown in Figures 7 and 8.

Figure 1:
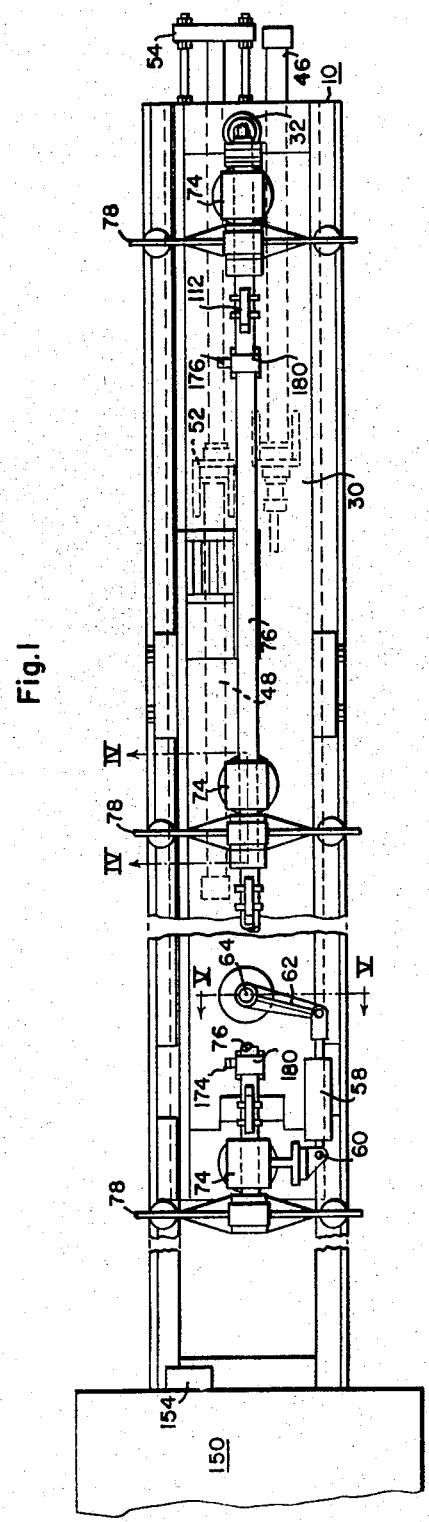
Figure 1 is a plan view of the overall invention.
Figure 2:
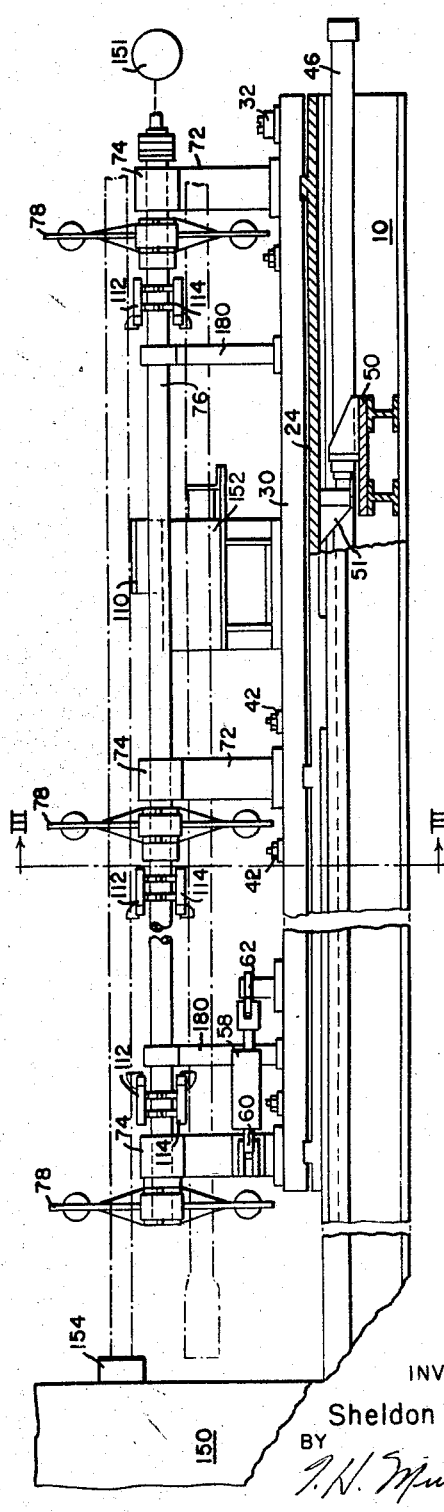
Figure 2 is a partially broken away side view of the invention.
Figure 3:
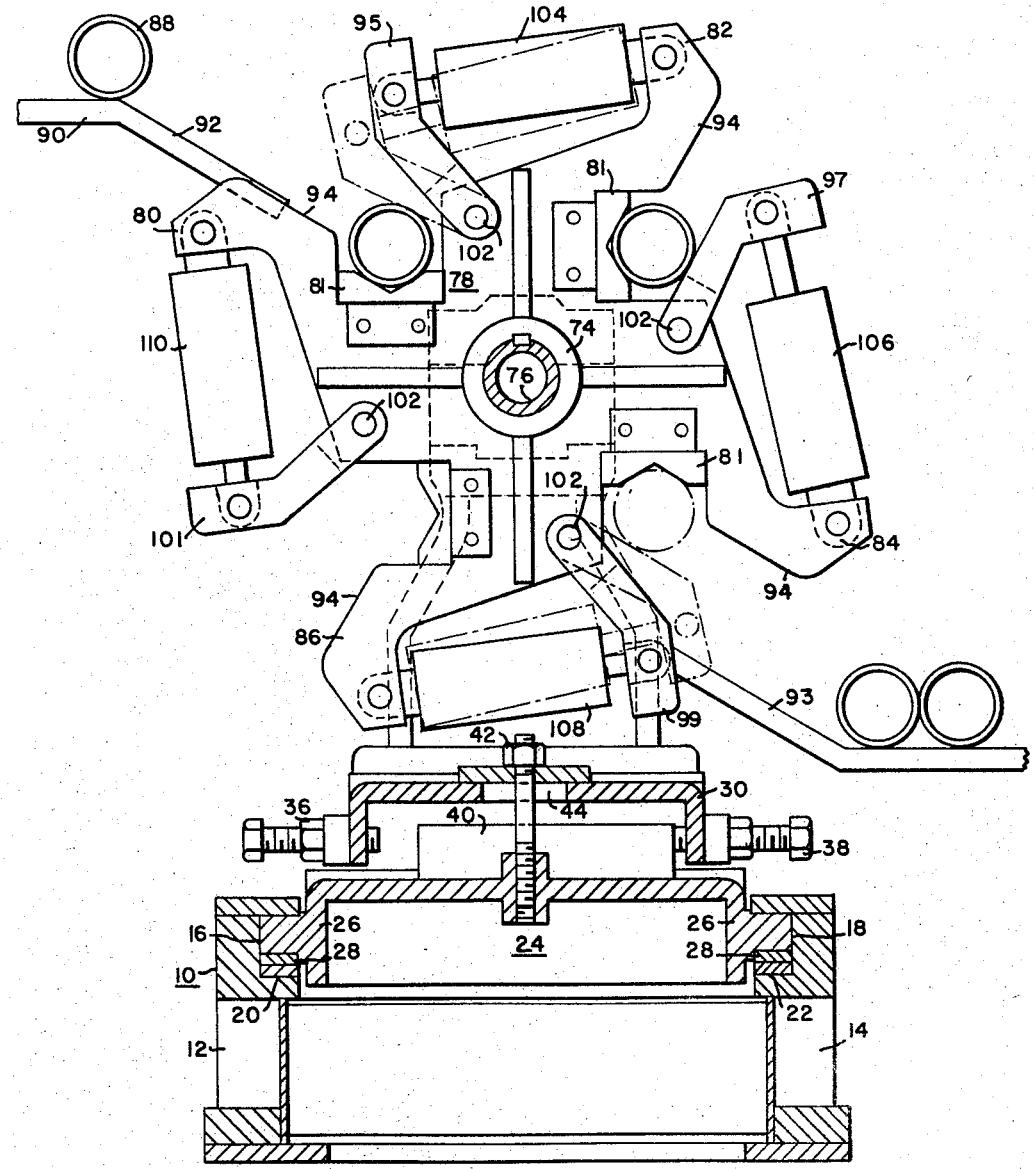
Figure 3 is a section taken along line III—III of Figure 2.

Referring to Figures 1, 2 and 3, the invention includes an elongated bed or track structure, generally indicated by the reference numeral 10. The track structure, best shown in cross section in Figure 3, comprises two upright side members 12 and 14 each of which has a right angle guideway or track 16 or 18 machined out of its upper inside corner. As shown, the tracks 16 and 18 are provided with wear strips 20 and 22, respectively. Reciprocably mounted on the tracks 16 and 18 is an elongated carriage 24 equipped with a plurality of spaced lugs 26 on each of its sides. The lugs are also provided with wear plates 28 which ride on the strips 20 and 22. Longitudinal movement of the carriage 24 is limited by stop members, not shown, which are fastened between successive ones of the spaced lugs 26.

Figure 4:
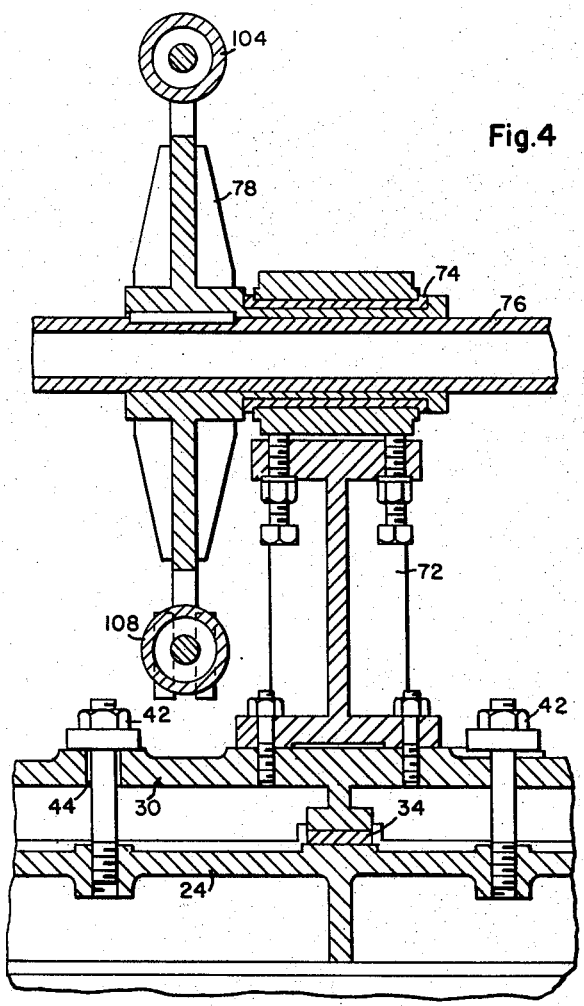
Figure 4 is a section taken along line IV—IV of Figure 1.

Above carriage 24 is positioned an inverted U-shaped bedplate 30 which is pivotally connected to carriage 24 by an upright pin member 32 located at the right end of the carriage 24 as viewed in Figures 1 and 2. The left end of the bedplate 30 is free to swing out of alignment with respect to the carriage on wear strips 34, best shown in Figure 4. Movement of the bedplate is limited by two adjusting bolts 36 and 38, shown in Figure 3, which are adapted to engage an abutment 40 extending upwardly from the carriage 24. In the position shown in Figure 3, the bedplate is in alignment with the carriage 24 while bolt 38 engages abutment 40. When bolt 36 engages the abutment, the bedplate will have rotated about pin member 32 and will, of course, be out of alignment with respect to the carriage. Bolts 42 extending through slots 44 in the bedplate hold the same in engagement with the wear strips 34 while permitting transverse movement with respect to carriage 24.

To reciprocate carriage 24 on the tracks 20 and 22 there are provided two single-acting hydraulic cylinders 46 and 48. The cylinder 46 is carried on a support 50 on bed 10 and has a piston rod which engages an abutment 51 extending downwardly from the carriage 24. The cylinder 48 is also carried by a support 52 on bed 10 and has a piston rod fastened to a plate 54 which extends outwardly from the right end of carriage 24 as shown in Figure 1. When cylinder 48 is pressurized, it will extend while telescoping the cylinder and piston 46 to force carriage 24 to the position shown in Figures 1 and 2. On the reverse stroke, cylinder 46 is pressurized to force the carriage to the left while telescoping cylinder and piston 48.

Figure 5:
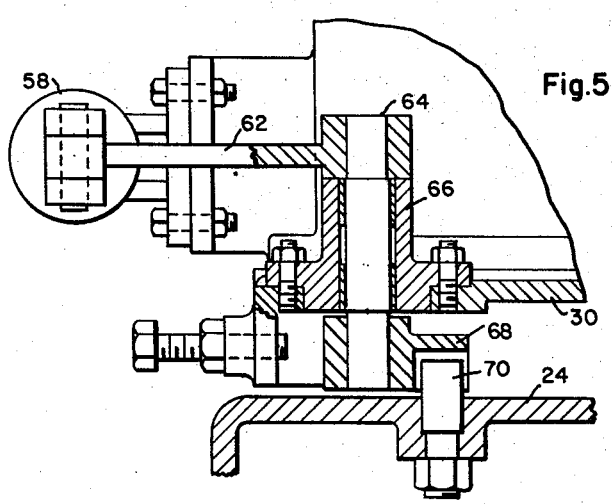
Figure 5 is a section taken along line V—V of Figure 1.

Bedplate 30 is forced into and out of alignment with respect to carriage 24 by means of a hydraulic cylinder arrangement, best shown in Figures 1, 2 and 5. The arrangement comprises a double-acting fluid motor 58 which is pivotally connected to carriage 24 at 60. The piston rod of fluid motor 58 is connected as shown to the free end of a crank arm 62 which is keyed to the upper extremity of an upright pin 64 extending through the bedplate 30. The pin is journaled in a bearing 66 and has a slotted arm member 68 keyed to its lower extremity. The slotted arm, in turn, is arranged to receive a dowel 70 which is secured in carriage 24. As will be understood, pin 64 will rotate when fluid motor 58 is pressurized in one sense to rotate the bedplate about pin member 32 and out of alignment with respect to carriage 24; whereas, when the fluid motor is pressurized in the opposite sense, the bedplate will be forced into alignment with the carriage.

Spaced along bedplate 30 are a series of upright support columns 72 each of which carries a journal bearing 74 for an elongated tubular shaft 76. Keyed to the shaft 76 are a plurality of disc-like tube supporting members 78. As shown in Figure 3, each supporting member comprises a main body portion of plate steel having four L-shaped arms 80, 82, 84 and 86 extending radially outwardly therefrom. Between each of the arms 80–86 in the main body portion is positioned a V-shaped block 81 which acts as a tube seat. When the supporting members are in the position shown in Figure 3, tubular members 88 on a transfer table 90 will roll down an inclined conveyor 92 and onto a surface 94 provided on one side of the arm 80. As will be understood, the surface 94 effectively forms an extension of the conveyor 92 so that the individual tubular members 88 may roll down to the V-shaped blocks between successive arms. On the other side of the device is a second conveyor 93 which serves to discharge the tubular members 88.

Opposite the surface 94 on each of the arms 80–86 are clamping members 95, 97, 99 and 101, each of which is pivotally connected to an associated one of the arms at 102. The clamping members are moved from a closed position to an open position and vice versa by four double acting pneumatic cylinders 104, 106, 108, and 110. As shown, each cylinder is straddled between an end of one of the arms 80–86 and the free end of an associated one of the clamping members 95–101. Conduits and appropriate control valves, shown in Figure 6, are provided to supply fluid pressure to the cylinders 104–110 and control the operation of the clamping members 95–101.

Referring, now, to Figure 6, it can be seen that each of the three tube supporting members 78 is provided with a pair of identical solenoid-operated spool valves 112 and 114 fastened to the shaft 76 by means of clamps 116 and 118. Each valve comprises a main body portion 120 having an inlet port 122, two working ports 124, 126, and two exhaust ports 128, 130. Fluid under constant pressure is introduced into the hollow interior of shaft 76 and fed to inlet ports 122 through conduits 132 and 134 which are connected to a port 136 in the shaft.

The working port 124 of valve 112 is connected through conduit 138 to the right side of cylinder 104 and also to the right side of cylinder 108 as viewed in Figure 6. The left sides of the respective cylinders are each connected to the working port 126 of valve 112 through conduit 140. Thus, when the spool valve member 142 is shifted downward as shown in Figure 6, cylinder 108 will force clamping member 99 into gripping position while cylinder 104 retracts clamping member 95. During this time, the left sides of the cylinders are connected to the inlet port 122 through conduit 140 and working port 126. Obviously, when the spool valve member 142 is shifted upward, the positions of clamping members 95 and 99 will be reversed. In a similar manner, the opposite sides of cylinders 106 and 110 are connected to working ports 124 and 126 in valve 114 through conduits 144 and 146. With this arrangement, each pair of diagonally opposite cylinders will occupy different positions, one forcing its associated clamping member into gripping position while the other forces its clamping member into retracted position.

Before the ends of the tubular members may be inserted into the dies of the upsetter machine (generally indicated at 150 in Figures 1 and 2) they must be positively indexed with respect to the face of the dies so that when carriage 24 is moved forward the ends of the tubular members will extend into the dies by the proper amount. For this purpose, there is provided a magnetic gripping device 152 which serves to force the tubular members against an abutment 154 on the face of the upsetter machine immediately after they are loaded onto the disc-like supporting members 78. As will be understood, the abutment is located in direct alignment with a tubular member held by clamping member 95 as viewed in Figure 3.

Referring to Figures 7 and 8, the magnetic gripping device comprises an adjustable support base 156 which carries a double-acting pneumatic cylinder and piston 158. On each side of the cylinder and piston 158 are positioned a pair of upright plates 160 and 162 which have guideways 164 and 166 machined in their upper inside surfaces. Reciprocably mounted in the guideways 164 and 166 is a carriage 168 which carries a V-shaped electromagnet 170. The V-shaped seat of the electromagnet is positioned to be in substantial alignment with the blocks 81 on the disc-like supporting members 78 when they reach the position occupied by the upper left-hand block 81 in Figure 3. In this manner when a tubular member 88 rolls down conveyor 92 and onto the V-shaped blocks 81, it will also come into contact with the V-shaped electromagnet 170. As shown, the piston rod of pneumatic cylinder 158 is connected to the carriage 168 at 172 whereby the electromagnet 170 will be shifted forward along a path of travel of fixed length when the cylinder 158 is pressurized in one direction and retracted when the cylinder is pressurized in the opposite direction.

To control energization of electromagnet 170 and operation of cylinder 158, there are provided two limit switch assemblies 174 and 176 which are located at opposite ends of the carriage 24 as shown in Figures 1 and 2. In Figure 9 the limit switch assembly 174 is shown in detail and includes a triangular structure 178 bolted to the side of a mount 180 which supports a bearing 182 for shaft 76. Pivotally connected to structure 178 at 184 is a lever 186 which carries a counterweight 188 on its outer extremity. The inner extremity of lever 186 is connected through linkages 190 and 192 to a limit switch 194, the arrangement being such that the counter-weight 188 will normally force the inner extremity of the lever 186 upward, in which position the switch 194 is open. When a tubular member 88 rolls down conveyor 92 and onto the V-shaped blocks 81, the lever 186 will be rotated downward about point 184 to thereby displace the linkages 190 and 192 and close the limit switch 194.

The switch 194 is connected in a series circuit arrangement with the switch 196 (shown schematically) of the second limit switch assembly 176, the electromagnet 170, a solenoid 198, and a source of voltage 200. Thus, the electromagnet 170 and solenoid 198 will be energized when, and only when, both of the limit switches 194 and 196 are closed. Solenoid 198 controls a spool valve 202, similar to valves 112 and 114, which, in turn, controls the application of air pressure from source 204 to the pneumatic cylinder and piston 158. Normally, the valve 202 will supply fluid pressure to cylinder 158 to force electromagnet 170 to its retracted position remote from the dies of the upsetter machine 150. When the solenoid 198 is energized, however, the valve will supply fluid pressure to cylinder 158 to force the electromagnet 170 forward. At the same time, the electromagnet 170 will be energized, and the resulting magnetic force produced will effectively clamp a tubular member to the electromagnet, thereby forcing the tubular member forward and into engagement with the abutment 154 on the face of the upsetter machine 150.

The foregoing arrangement has numerous advantages. Since both of the switches 194 and 196 must be closed before the electromagnet 170 is energized and moved forward, a tubular member must be in all of the V-shaped blocks 81 and in alignment with the axis of tubular shaft 76 before it can be moved into engagement with the abutment 154 on the upsetter machine. If only one switch were used, the electromagnet could be energized and moved forward before the tubular member was in alignment with shaft 76, thereby interrupting the normal operation of the machine. Further, since there is no mechanical engagement between electromagnet 170 and the tubular member, the electromagnet can slide forward on the tubular member after it engages abutment 154. This is a distinct advantage since tubes of many different sizes may be brought into registry with the abutment 154 without indexing the stroke of cylinder 158 for each particular length. A still further advantage lies in the fact that the electromagnet 170 will always hold the end of a tubular member in firm engagement with abutment 154 regardless of its length. In contrast, the tubular member would have a tendency to recoil from the abutment if it were moved forward by a pusher or other similar mechanical arrangement. If it is found that a substantial magnetic force exists between the tube-supporting members 78 and the tubular member, which is in engagement with the electromagnet 170, to impede the forward movement of the tubular member, the tube seats 81 may be made from nylon or other non-magnetic material.

Operation of the invention is as follows: Initially, the carriage 24 will be at the right end of track structure 10 as shown in Figures 1 and 2 so that fluid motor 46 will be telescoped while fluid motor 48 will be extended. During this time, adjusting bolt 38 (Figure 3) will engage abutment 40 so that the bedplate 30 is in alignment with the carriage 24. Means, generally indicated by the reference numeral 151 in Figure 1, are provided to rotate the shaft 76 through 90 degree increments. As will be understood, the device is indexed so that each surface 94 of the arms 80-86 will be successively aligned with the conveyor 94.

When the surface 94 of arm 80 is aligned with conveyor 92, a tubular member will roll down the surface and onto the pipe seat 81 on each of the three supporting members 78. As the tubular member rolls onto the pipe seats 81, it will simultaneously engage the inner extremities of the levers 186 on the limit switch assemblies 174 and 176. This closes the circuit to electromagnet 170 and solenoid 198 so that the tubular member is moved forward and into engagement with the abutment 154 on the face of the upsetter machine 150. Thereafter, cylinder 104 will be pressurized to force clamping member 95 to the left as shown by the broken lines in Figure 3 to secure the tubular member against the seats 81. During this time, cylinder 108 is pressurized in the opposite sense to rotate clamping member 99 to the left to release its tubular member and allow the same to roll down the surface of the clamping member and onto conveyor 93. It will be understood that during the loading and unloading operation, a tubular member is secured by clamp 97 while the diagonally opposite cylinder 110 holds clamp 101 in retracted position. After one tubular member is clamped and the other released in the manner described above, shaft 76 will be rotated to the right as shown in Figure 3, through 90 degrees. Generally, the torque applied to rotate shaft 76 will be sufficient to free the tubular member from electromagnet 170 and thereby open limit switches 194 and 196 to deenergize the electromagnet. However, if desired, an operator-operated switch may be added to the circuit of Figure 9 to deenergize the electromagnet before torque is applied to shaft 76. The tubular member held by clamp 95 will now be in the position formerly occupied by the tubular member held by clamp 97, and this member will have, in turn, moved to the unloading position adjacent conveyor 93. In this position, the tubular member held by clamp 97 will be in direct alignment with the die of the upsetter machine 150. In some cases the upsetting machine may have two dies, one above the other, for performing a progressive forging operation on the ends of the tubular members. That is, part of the forging operation will be performed in an uper die, and the remainder will be performed in a second die located directly below the first. In this latter case, both of the tubular members located to the right of shaft 76, as viewed in Figure 3, will be in alignment with an associated die.

Assuming that the loading and unloading operation has been completed and that the shaft 76 has been rotated through 90 degrees, fluid motor 46 will now be pressurized to force the carriage 24, bedplate 30 and the tubular members to the left as viewed in Figures 1 and 2. This action forces the left ends of the tubular members into one or more of the upsetter machine dies, each of which is separable to permit unrestricted movement of the tube ends into the dies. When the tube ends extend into the dies, the carriage 10 will engage the aforementioned stop members, now shown, thereby halting the leftward movement of the conveyor. The separated dies in the upsetter machine are then closed around the tube ends and a forging operation is performed.

At the conclusion of the forging operation, the dies are separated. The tubes, however, cannot readily be pulled out of the dies while they are in alignment with the same since the surface of the forged tube will cling to the surface of at least one part of the die, or it may be of irregular shape which makes it impossible to pull the tubular member straight back. The purpose of a pivoted arrangement such as bedplate 30 now becomes apparent. To dislodge the ends of the tubes from the upsetter dies, fluid motor 58 is pressurized to rotate the bedplate 30 about pin member 32. This action, of course, misaligns the bedplate and tubular members with respect to the center-lines of the dies, thereby freeing the ends of the tubes from the dies.

When the tubular members are thus dislodged, fluid motor 48 is pressurized to force carriage 24 to the right as viewed in Figures 1 and 2. At the same time, fluid motor 58 is pressurized in the opposite sense to rotate bedplate 30 about pin member 32 and back into alignment with the upsetter dies and track structure 10. At the end of its reverse stroke, the carriage 10 will strike a stop member in the position shown in Figures 1 and 2.

Finally, the tube held by the clamping member adjacent conveyor 93 will be released, and a new tube will roll down conveyor 92 and onto the pipe seats 81, thereby starting a new cycle of operation.

Although the invention has been shown in connection with a certain specific embodiment, it will be readily apparent to those skilled in the art that various changes in form and arrangement of parts may be made to suit requirements without departing from the spirit and scope of the invention.

I claim:

1. In combination, a track structure, a carriage reciprocably mounted on said track structure, a rotatable shaft positioned on said carriage substantially parallel to said track structure, a plurality of disc-like members mounted on said shaft for rotating tubular members through an arc of 180°, arms extending outwardly from the disc-like members, seats for tubular members carried by the disc-like members between successive ones of said arms, means for feeding tubular members between successive ones of said arms, means carried on the arms for clamping tubular members between successive ones of the arms, and means for pivoting said shaft about a substantially vertical axis located at one end of the shaft.

2. In apparatus of the type described, a track structure, an elongated carriage reciprocably mounted on said track structure, an elongated bedplate having one end pivotally connected to one end of said carriage, an elongated shaft supported on the bedplate substantially parallel to the long transverse dimension of the bedplate, a plurality of disc-like members carried on said shaft, means on the disc-like members for clamping elongated members substantially parallel to said shaft, means for selectively rotating said shaft, and apparatus for selectively rotating the bedplate with respect to the carriage about the pivotal connection therebetween.

3. In apparatus of the type described, a track structure, an elongated carriage reciprocably mounted on the track structure, an elongated bedplate positioned above said carriage, means pivotally connecting one end of said carriage to one end of said bedplate whereby the bedplate may rotate about the connecting means, a plurality of upright supporting stands mounted on said bedplate and spaced along the long transverse dimension of the bedplate, a rotatable shaft carried on said supporting stands, disc-shaped members spaced along said shaft for gripping elongated members, and means for rotating said shaft and the elongated members carried thereby.

4. In combination, a track structure, an elongated carriage reciprocably mounted on the track structure, an elongated bedplate positioned above said carriage, an upright pin member connecting one end of the carriage to one end of the bedplate whereby the bedplate may rotate about the pin member, an elongated shaft positioned on said bedplate parallel to the longitudinal axis of the bedplate, means on the shaft for gripping tubular members and for rotating the same from one position to another, and means to rotate the bedplate about said pin member, said last-mentioned means comprising an upright axle journaled in the bedplate, a linkage secured to the axle and extending radially outwardly therefrom, a projection extending from the carriage and arranged to cooperatively engage said linkage, and means for rotating said axle.

5. In apparatus of the type described, an elongated track structure, a carriage reciprocably mounted on said track structure, an elongated bedplate pivotally connected to said carriage, a rotatable shaft mounted on said bedplate substantially parallel to the longitudinal axis of the bedplate, a plurality of disc-shaped members spaced along said shaft, a plurality of radially outwardly extending slots in each of the disc-shaped members, the slots in the respective members being aligned with the slots in the other members for the reception of elongated stock, means for gripping the stock within said slots, means for selectively rotating said shaft, and means for selectively rotating said bedplate about its pivotal connection with said carriage.

6. In combination, an elongated track structure, an elongated bedplate reciprocably mounted on said track structure, an endless circular conveyor supported on said bedplate and rotatable about an axis which is substantially parallel to said track structure, means on said conveyor for gripping elongated members in substantial parallelism with said axis, means for rotating said conveyor through a succession of stations from a loading station to an unloading station, means at said loading station for feeding elongated members to said gripping means, means at said unloading station for discharging elongated members from said gripping means, and means for selectively pivoting said bedplate about a vertical axis extending between one end of said track structure and one end of the bedplate.

7. In combination, an elongated track structure, a conveyor reciprocably mounted on said track structure, said conveyor comprising a rotatable shaft supported above and substantially parallel to said track structure, a plurality of disc-like members spaced along said shaft, radially outwardly extending slots in said disc-like members arranged for the reception of elongated stock, the slots in each of said disc-like members being aligned with the slots in the other members, means for clamping the elongated stock within said aligned slots, means for rotating said shaft and the elongated stock carried thereby through a succession of stations, means at one of said stations for feeding stock into said slots, means at another of said stations for discharging stock from said slots, and means for selectively pivoting said rotatable shaft about a vertical axis.

8. In combination with a structure having a series of aligned support surfaces spaced therealong, apparatus for sliding an elongated member axially along said aligned support surfaces and comprising an electromagnet reciprocable along a path which is parallel to the longitudinal axis of said aligned support surfaces, a surface on said electromagnet arranged in alignment with said support surfaces, means for reciprocating the electromagnet along said path through a predetermined stroke, a source of electrical energy for the electromagnet, circuit means including a normally open switch device for connecting said source of energy to the electromagnet, said switch device being arranged for engagement with an elongated member positioned on said supports, the arrangement being such that the switch device will be closed to apply said source of energy to the electromagnet when an elongated member rests on said support surfaces, and an abutment positioned at one end of said structure and in substantial alignment with said support surfaces for limiting movement of said elongated member along said surfaces, the electromagnetic force produced by said magnet being such that the elongated member will be dragged along said support surfaces until an end thereof strikes said abutment, whereupon the magnet will slide along said elongated member for the remainder of its stroke.

9. Apparatus for sliding an elongated member along a series of spaced support surfaces and into engagement with an abutment positioned at one end of the elongated member comprising, in combination, an electromagnet reciprocable along a path of travel having a predetermined fixed length, said electromagnet being arranged for engagement with an elongated member positioned on the support surfaces, a source of electrical energy for the electromagnet, circuit means including a switch device engageable by an elongated member positioned on said support surfaces for connecting said energy source to said electromagnet, and a motor device operable by said switch device for moving said electromagnet along its predetermined path of travel, the arrangement being such that the electromagnet will move with the elongated member until the same engages said abutment, whereupon the electromagnet will slide along the elongated member for the remainder of its predetermined path of travel.

10. In combination, a track structure, an elongated carriage reciprocably mounted on said track structure, an elongated shaft positioned on said carriage, said shaft being rotatable about its longitudinal axis and pivotable about a substantially vertical axis extending between one end of said shaft and one end of the carriage, a plurality of tube-supporting discs carried on said shaft and concentric therewith, means spaced around the peripheries of said discs for clamping tubular members parallel to said shaft, means for selectively rotating said shaft, and means for selectively pivoting said shaft about said substantially vertical axis.

11. In combination, a track structure, an elongated bedplate reciprocably mounted on said track structure and having its long transverse dimension extending parallel to said track structure, upright supporting stands mounted on said bedplate and spaced along the long transverse dimension thereof, a rotatable shaft carried on said supporting stands, a plurality of disc-like tube supporting members spaced along said shaft and concentric therewith, devices carried on the outer peripheries of said disc-like members for clamping tubular members substantially parallel to the long transverse dimension of said bedplate, and means for selectively pivoting said bedplate about a substantially vertical axis extending between one end of said bedplate and a corresponding end of the track structure.

References Cited in the file of this patent

UNITED STATES PATENTS

| | | |
|---|---|---|
| 653,506 | Edwards | July 10, 1900 |
| 744,874 | Neeland | Nov. 24, 1903 |
| 1,343,648 | Smith | June 15, 1920 |
| 1,423,856 | Jupp et al. | July 25, 1922 |
| 1,871,077 | Mowat | Aug. 9, 1932 |
| 2,528,860 | Clark | Nov. 7, 1950 |
| 2,724,482 | De Francisci | Nov. 22, 1955 |
| 2,777,520 | Grezenkowski | Jan. 15, 1957 |